(12) United States Patent
Liu et al.

(10) Patent No.: US 7,756,594 B2
(45) Date of Patent: Jul. 13, 2010

(54) SYSTEMS AND METHODS FOR PARSING FLEXIBLE AUDIO CODEC TOPOLOGIES

(75) Inventors: Cheng-mean Liu, Redmond, WA (US); Noel R. Cross, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1725 days.

(21) Appl. No.: 10/867,494

(22) Filed: Jun. 14, 2004

(65) Prior Publication Data

US 2005/0278168 A1 Dec. 15, 2005

(51) Int. Cl.
  *G06F 17/00* (2006.01)
  *G06F 13/00* (2006.01)
  *G06F 9/00* (2006.01)
(52) U.S. Cl. .............................. 700/94; 710/104; 713/1
(58) Field of Classification Search ................... 700/94; 713/1, 2, 100; 710/104
See application file for complete search history.

(56) References Cited

U.S. PATENT DOCUMENTS

| | | | |
|---|---|---|---|
| 5,613,137 A | 3/1997 | Bertram et al. | |
| 5,815,689 A * | 9/1998 | Shaw et al. | 713/400 |
| 5,875,311 A | 2/1999 | Bertram et al. | |
| 5,913,038 A * | 6/1999 | Griffiths | 709/231 |
| 5,916,309 A | 6/1999 | Brown et al. | |
| 5,982,672 A | 11/1999 | Moon et al. | |
| 5,995,933 A * | 11/1999 | Fado et al. | 704/270 |
| 6,016,515 A * | 1/2000 | Shaw et al. | 719/321 |
| 6,025,925 A | 2/2000 | Davidson, Jr. et al. | |
| 6,038,625 A * | 3/2000 | Ogino et al. | 710/104 |
| 6,044,225 A | 3/2000 | Spencer et al. | |
| 6,104,700 A | 8/2000 | Haddock et al. | |
| 6,128,317 A | 10/2000 | Mackre | |
| 6,173,358 B1 | 1/2001 | Combs | |
| 6,226,038 B1 | 5/2001 | Frink et al. | |
| 6,259,957 B1 * | 7/2001 | Alexander et al. | 700/94 |
| 6,408,351 B1 | 6/2002 | Hamdi et al. | |
| 6,463,486 B1 | 10/2002 | Parry et al. | |
| 6,564,330 B1 | 5/2003 | Martinez et al. | |
| 6,567,875 B1 | 5/2003 | Williams et al. | |
| 6,629,001 B1 * | 9/2003 | Vadivelu | 700/94 |
| 6,714,724 B1 | 3/2004 | Cook | |
| 6,842,830 B2 | 1/2005 | Khare et al. | |
| 6,956,818 B1 | 10/2005 | Thodiyil | |
| 7,131,135 B1 * | 10/2006 | Virag et al. | 725/80 |
| 7,155,543 B2 | 12/2006 | Lee et al. | |
| 7,194,564 B2 * | 3/2007 | Hauck et al. | 710/104 |
| 7,346,716 B2 | 3/2008 | Bogin et al. | |

(Continued)

OTHER PUBLICATIONS

Analog Devices, "AC'97 SoundPort Codec AD1819B", 1999, pp. 1-28.*

(Continued)

*Primary Examiner*—Vivian Chin
*Assistant Examiner*—Daniel R Sellers
(74) *Attorney, Agent, or Firm*—Lee & Hayes, PLLC (57) ABSTRACT

Systems and methods for parsing flexible audio codec topologies are described. In one aspect, codec topology information is obtained from an audio codec. The codec topology information includes a list of processing node connections and configuration default data for respective processing nodes associated with the audio codec. The codec topology information is evaluated to identify valid audio codec topologies based on set of valid connection path criteria.

35 Claims, 3 Drawing Sheets

U.S. PATENT DOCUMENTS

| | | |
|---|---|---|
| 2002/0112097 A1* | 8/2002 | Milovanovic et al. ....... 709/331 |
| 2002/0116186 A1 | 8/2002 | Strauss et al. |
| 2002/0178210 A1 | 11/2002 | Khare et al. |
| 2003/0009654 A1 | 1/2003 | Nalawadi et al. |
| 2003/0088326 A1 | 5/2003 | Du et al. |
| 2004/0003137 A1 | 1/2004 | Callender et al. |
| 2004/0064210 A1* | 4/2004 | Puryear et al. ................ 700/94 |
| 2004/0128402 A1* | 7/2004 | Weaver et al. .................. 710/1 |
| 2004/0162911 A1 | 8/2004 | Sperschneider et al. |
| 2004/0268061 A1 | 12/2004 | Khare et al. |
| 2005/0060368 A1 | 3/2005 | Wang et al. |
| 2005/0195752 A1* | 9/2005 | Amin et al. .................. 370/254 |
| 2005/0226233 A1 | 10/2005 | Kryuchkov et al. |
| 2006/0031607 A1 | 2/2006 | Berreth |
| 2006/0041895 A1 | 2/2006 | Berreth |
| 2007/0220279 A1 | 9/2007 | Northcutt et al. |

OTHER PUBLICATIONS

Intel, "Intel 82801EB (ICH5) I/O 82801ER (ICH5R), and 82801DB (ICH4) Controller Hub: AC '97 PRM", Apr. 2003, pp. 1-53.*

"Audio Codec '97" Intel, Revision 2.3 Revision 1.0, Apr. 2002, 108 pages.

Jarrar et al.; "Designing in Azalia for High Performance Audio" Intel Developer Forum, Sep. 2003, 36 pages.

High Definition Audio Specification Revision 1.0; Intel Apr. 15, 2004 pp. i-174.

Intel I/O Controller Hub 6 (ICH6) High Definition Audio / AC '97; Programmer's Reference Manual (PRM); Intel Document No. 302349-001 Jun. 2004 p. 1-207.

"A DSP/BIOS Generic DMA McBSP Device Driver for TMS320C5000 DSPs", Software Development Systems, Texas Instruments, Jun. 2003, pp. 1-10.

* cited by examiner

SYSTEMS AND METHODS FOR PARSING FLEXIBLE AUDIO CODEC TOPOLOGIES

TECHNICAL FIELD

The technical field pertains to audio compressors/decompressors (codecs).

BACKGROUND

Since the Sound Blaster 1.0 (circa 1990) and the Windows Sound System (circa 1995) there has not been an open standard for PC audio hardware. This led to a proliferation of different hardware register sets and drivers to support those hardware interfaces. The commonality in most of these hardware designs was the capability to perform data transfers from main memory to the digital-to-analog converter (DAC) for rendering and from analog-to-digital converter (ADC) to main memory for capturing. If there is a standardized data transfer engine that a common software component can interface with, there is still a need to identify and manipulate the features of the digital audio converters in an intelligent manner. Techniques to determine and organize this information for any digital audio converter unit and present it to an operating system are desired, since they would provide for a single driver for audio solutions that conform to a general algorithm.

SUMMARY

Systems and methods for parsing flexible audio codec topologies are described. In one aspect, codec topology information is obtained from an audio codec. The codec topology information includes a list of processing nodes, processing node connections, and configuration default data for respective processing nodes associated with the audio codec. The codec topology information is evaluated to identify valid audio codec topologies based on set of valid connection path criteria.

BRIEF DESCRIPTION OF THE DRAWINGS

In the figures, the left-most digit of a component reference number identifies the particular figure in which the component first appears.

DETAILED DESCRIPTION

An Exemplary Uniform Architecture for an Audio Class Driver

Figure 1:
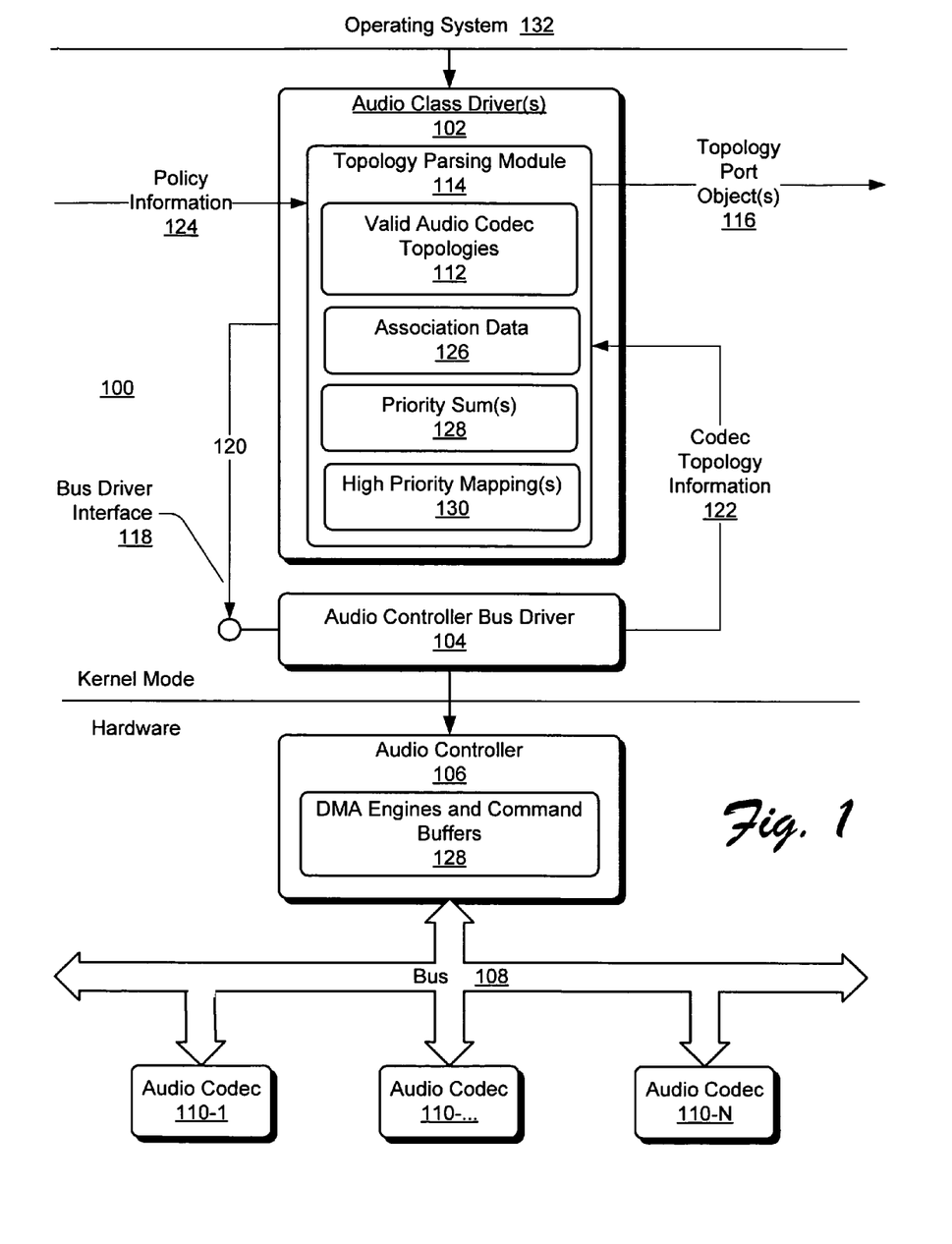
FIG. 1 shows exemplary audio class driver architecture for parsing flexible audio codec topologies.

FIG. 1 shows exemplary audio class driver architecture 100 for parsing flexible audio codec topologies. Architecture 100 is implemented in a computing device such as a general purpose computer. An exemplary such computing device is described below in reference to FIG. 3. Referring to FIG. 1, audio class driver architecture 100 includes audio class driver(s) 102, audio controller bus driver 104, and audio controller 106 coupled across bus 108 to an audio codec 110-1 through 110-N. Bus 108 is an internal bus such as a PCI bus. In one implementation, an audio codec 110 are High Definition Audio Codecs connected to jacks directed to external audio device(s), and/or internal audio device(s) (e.g., a mobile speaker). For purposes of discussion, audio codecs 110-1 through 110-N may hereinafter be collectively represented as "audio codec(s) 110".

Audio class driver(s) 102 identify basic logical audio device topologies presented by installed audio codec(s) 110 from one or more different respective manufacturers. For purposes of discussion, an audio codec 110 topology provides data/signal routing information, in other words, possible connections of elements within a codec. A topology provides information that represents an audio codec's physical connections to external devices. These connections typically carry analog output signals that drive speakers and analog input signals from microphones. A topology might also represent analog line-in and line-out jacks, and possibly even digital input and output connectors.

Audio class driver(s) 102 identifies and provides valid ones of the identified audio codec topologies to an OS, thereby allowing the OS and applications operating thereunder to take advantage of an audio codec's topology configuration for basic and advanced audio device functionality. Valid topologies are shown as valid audio codec topologies 112, wherein each topology 112 represents a substantially best render or capture connection path provided by the audio codec 110. For instance, respective ones of valid audio codec topologies 112, for example, end with a processing node that has a physical connection, does not loop, have an input/output connection point that is not a shared codec resource with another audio path, are compatible with system vendor motherboard design settings (i.e., excludes vendor specific audio processing units), and take user policy settings into consideration. For purposes of discussion, a connection point represents a physical connection to a jack, plug, etc., or a logical connection to computer-program instructions executable by a processor, wherein when executed the instructions direct data flow from one component to another.

With respect to a loop, a connection path/topology is considered to loop if the topology has a same processing node that's already in another connection path. Each render connection path of valid audio codec topologies 112 starts from a DAC/Digital Out connection point, continuing to an associated output connection point. Each capture connection path of valid audio codec topologies 112 starts from an ADC/Digital In connection point, continuing to an associated input connection point.

This audio class driver 102 parsing to identify valid audio codec topologies 112 is useful because an audio codec may present many (e.g., tens of thousands) of topologies, many of which may represent invalid connection paths. An invalid audio codec topology includes, for example, a topology path that terminates with a processing node that does not have a physical connection; a topology that infinitely loops without exiting the codec, topologies that share a limited resource such as a same input or output connection point—possibly resulting in unreliable operation if associated devices contend for the shared resource at the same time, a topology contrary to system motherboard configurations, a topology contrary to a user's preferences, and/or so on.

To identify valid audio codec topologies 112 for any number of independent audio codec(s) 110 from different respective manufacturers, audio class driver(s) include a respective audio codec topology parsing functionality, for instance, topology parsing module 114. As described below, topology parsing module 114 uses a set of priority-based criteria to evaluate valid audio codec topologies 112 and therefrom, generate a set of mixer and/or wave topology object(s) 116 from ones of the valid audio codec topologies having a most significant priority (i.e., high priority mappings 130, which are described in greater detail below). These topology objects 116 allow an OS, and applications operating thereunder, to interface with respective ones of logical devices associated with the prioritized valid audio codec topologies for basic audio support.

For instance, topology port objects 116 represent substantially optimal audio connection paths in view of the processing node connection list of codec topology information 122. Topology port objects 116 are used to initialize audio codec(s) 110 with third-party application commands on startup, to get and set properties in audio codec(s) 110, to provide power management of audio codec(s) 110, etc. In this manner, audio class driver(s) 102 enable an OS to provide a reliable and consistent out-of-box audio experience to application users. The systems and methods for parsing flexible audio codec topologies also substantially eliminate dependence of a computing system's basic audio capabilities on IHV proprietary device drivers, which may be very inconsistent in terms of quality and reliability from vendor to vendor.

Exemplary Procedure for Parsing Audio Codec Topology

Figure 2:
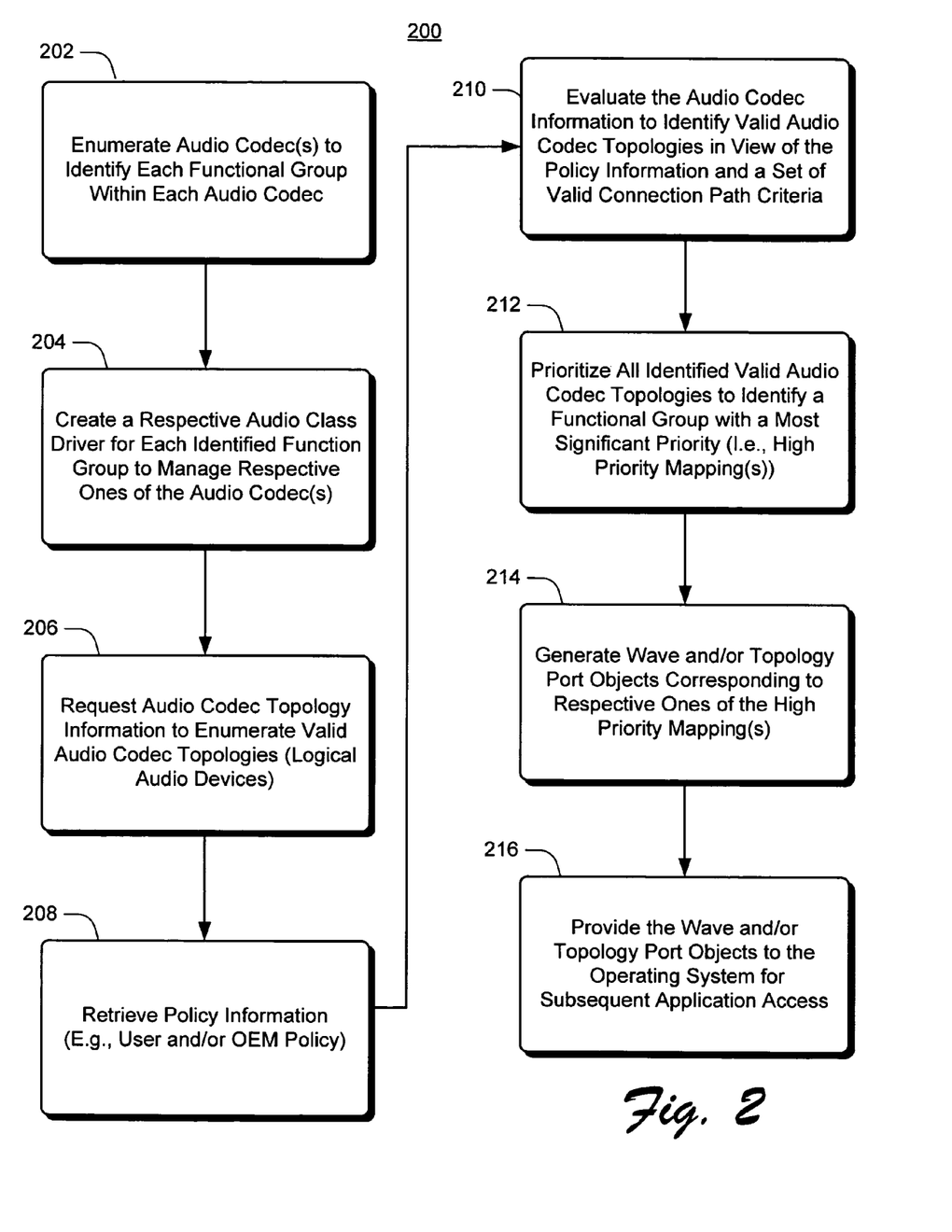
FIG. 2 shows an exemplary procedure to parse audio codec topologies, and thereby, identify valid logical audio devices.

FIG. 2 shows an exemplary procedure 200 for parsing flexible audio codec topologies. For purposes of discussion and illustration, the operations of procedure 200 are described in reference to aspects of FIG. 1. (The left-most digit of a component reference number identifies the particular figure in which the component first appears). At block 202, audio class driver 102 (FIG. 1), via audio controller bus driver 104, enumerates logical audio device(s) supported by audio codec(s) 110. At block 204, an overlying operating system 132 loads audio class driver(s) 102 for each identified function group supported by the enumerated logical audio device (s). For purposes of discussion, a function group is a collection of audio processing units that are common to a single application/purpose. Audio controller 106 provides DMA engines and command buffers 128 for transferring commands 120 and data via bus driver application programming interface (API) 118 to/from audio class driver(s) 102 from/to codec(s) 110.

At block 206, topology parsing module 114, for example during initialization operations, uses bus driver interface 118 to send a command 120 to each audio codec 110 being managed by the audio class driver(s) 102. In this scenario, command 120 requests codec topology information 122 including, for example, a connection list from each of the managed audio codec(s) 110 and target use of the jack on the device. The connection list identifies the processing node connections that make up respective ones of the audio codec connection paths/topologies implemented by the audio codec 110. Processing node connections specify one or more audio render and capture node connection in paths. Each connection path indicates the particular processing nodes being used in the connection path, and the respective order of connection.

For example, a codec's number 1, 4, and 6 connection points (processing nodes) may be specified as a logical audio device ending in a connection point for audio output—an audio render path. In another example, the codec's number 6, 9, 12, 17, and 28 connection points may be specified as a logical audio device ending in a connection point for audio input—audio capture path architecture. Connection point numbers, order of connection point connections, and respective connection path functions (e.g., render or capture path(s)) are a function of audio codec 110 implementation.

In one implementation, topology information 122 includes, for example, for at least a subset of the audio codec(s) 110, a processing node (connection point) connection list and configuration default information from audio jack default configuration information (last processing nodes in a connection path). In this implementation, such configuration default information includes at least a subset of the following:

digital-to-audio converter (DACs) configuration;
audio-to-digital converter (ADCs) configuration;
jack-sensing configuration;
codec port connectivity default values;
location;
default device;
connection type(s); and/or
jack grouping information—information used to logically associate a collection of jacks that have a common purpose (i.e. rear panel jack group information describing jacks that are physically located near each other, three (3) stereo audio processing units grouped into a six (6) channel audio device, etc.). (Audio processing units that have a same default jack grouping information will be combined into one single device).

At block 208, topology parsing module 114 retrieves policy information 124. Policy information 124 includes, for example, user audio policy settings and original equipment manufacturer (OEM) policy settings. In one implementation, audio class driver(s) 102 obtain user policy 124, for example, from an audio device property page corresponding to an audio codec 110. User policy 124, for example, is a set of device profiles that specify how a user expects an underlying codec to be used. And the information contained in each device profile is equivalent to the information that's contained in jack configuration information of each last processing node in a connection path. So each time a user changes to a new device profile, the described systems and methods for parsing flexible audio codec topologies is invoked to generate new topologies.

OEM policy 124 is used to identify audio codec connection path(s) that may conflict and override values provided by audio codec(s) 110. For instance, if a connection path conflicts with user or OEM policy, topology parsing module 114 eliminates/filters the connection path such that it will not be included in the valid audio codec topologies 112. Audio class driver(s) 102 obtain OEM policy 124, for example, through an ACPI BIOS. An exemplary ACPI BIOS is shown and described below in reference to BIOS 333 of FIG. 3.

At block 210, topology parsing module 114 parses the received codec topology information 122 in view of policy information 124 and the above described set of valid connection path criteria to identify valid audio codec topologies 112. In one implementation, operations of block 210 are as follows. Topology parsing module 114 collects all DAC/ADC resource processing nodes. Topology parsing module 114 creates separate resource lists for DAC (including SPDIF Out) and ADC (including SPDIF In). This prepares for the next step—enumerating all the paths. Based on each processing node's connection and configuration default register information (provided by respective portions of codec topology information 122), topology parsing module 114 enumerates all the possible render and capture paths. For instance, starting from resource processing nodes (DAC or ADC nodes), topology parsing module 114 recursively enumerates all the possible audio data paths that could reach a last connection point in a connection path.

During the enumerating process, topology parsing module 114 applies several qualifying criteria dynamically to eliminate paths that are either invalid or unsupported. As indicated above, invalid paths include, for example: paths that have any loop, paths that do not end with a render or capture processing node, paths starting with DACs (SPDIF OUT) but not ending with audio processing units used as output devices, and/or paths starting with ADCs (SPDIF IN) but not ending with audio processing units used as input devices, paths ending with no physical audio processing units. At this point, topology parsing module 114 builds a table indicating processing nodes and respective connection paths within which the processing node participates. For purposes of discussion and illustration, this table is shown as a respective portion of valid audio codec topologies 112.

At block 212, topology parsing module 114 prioritizes each valid audio codec topology 112 as a function of jack grouping information default value of a connection point at the end of a connection point connection path corresponding to the valid audio codec topology 112. For purposes of illustration, codec topology information 122 includes the jack grouping information default value of a connection point at the end of a connection path. More particularly, groups of calculated valid audio codec topologies 112 may have more than a single association. To produce a single valid set or group of audio codec topologies 112, topology parsing module 114 first gathers default jack grouping and sequence information from configuration default registers for each connection point audio processing unit identified in valid audio codec topologies 112. TABLE 1 shows an exemplary jack grouping sequence list.

TABLE 1

EXEMPLARY JACK GROUPING AND SEQUENCE LIST

Assoc(2)
    Sequence 0 -> ConnectionPointAudio processing unit 0x10
    Sequence 0 -> ConnectionPointAudio processing unit 0x08

As shown in TABLE 1, the jack grouping and sequence list is sorted with respect to respective associations. As indicated above, an association groups jacks together into functional blocks. Each association includes one or more capture or render audio processing nodes (last nodes in a connection path). In this implementation, the number of groups in the association sequence list, which is shown as a respective portion of association data 126, represents a maximum number of logical audio devices that may be exposed to system 100.

At this point, topology parsing module 114 identifies all non-conflicting I/O processing nodes and path combinations within each association identified in the association list. The identified nodes and path combinations are represented in a respective node path mapping combination portion of association data 126. Topology parsing module 114 enumerates all association resource mappings represented in the node path mapping combinations. An association resource mapping is a set of non-conflicting resource allocations across all processing nodes of all associations identified in the node path mapping combinations. Such association resource mappings are also represented with a respective portion of association data 126.

To prioritize the valid audio codec topologies 112, topology processing module 114 assigns a weighted association value to each topology identified in the association resource mappings portion of association data 126. To this end, the association value of the corresponding connection path is used as a weighted priority, and each priorities are calculated as follows:

$$\text{priority}=2^{N-k},$$

wherein N represents a maximum association default value identified among all of the valid audio codec topologies 112, and k represents the association default value of the particular association group being prioritized. For example, if the logical audio device has a corresponding association default value equal to three (3) and the maximum association default value is 6, and then the weighted association value for the topology is equal to eight (8), which is equal to $2^{6-3}$.

Operations of block 212 further calculate a respective priority sum 128 representing a sum of weighted association values corresponding to each valid audio codec topology 112 in a respective group. Thus, each group of audio codec resource allocation for association is associated with a respective priority sum 128. As indicated below, the group with the largest priority sum 128 is selected as the group of valid audio codec topologies 112 to expose to an operating system via topology port object(s) 116. For purposes of discussion and illustration, the group of topologies determined to have the most significant priority is shown as high priority mapping(s) 130.

At block 214, topology parsing module 114 converts highest priority mappings 130 (i.e., the group of valid audio codec topologies 112 having the most significant priority sum 128) to wave and/or topology port object(s) 116. To this end, topology parsing module 114 determines whether respective ones of the represented connection paths should be converted to a wave port object or a topology port object 116. At block 216, audio class driver(s) 102 provide respective ones of the wave and/or topology port object(s) 116 to the operating system. As described above, application(s) executing under the OS can use the wave and/or topology port objects 116 to interface with application targeted logical audio devices identified by respective ones of the valid audio codec topologies 112.

An Exemplary Operating Environment

Figure 3:
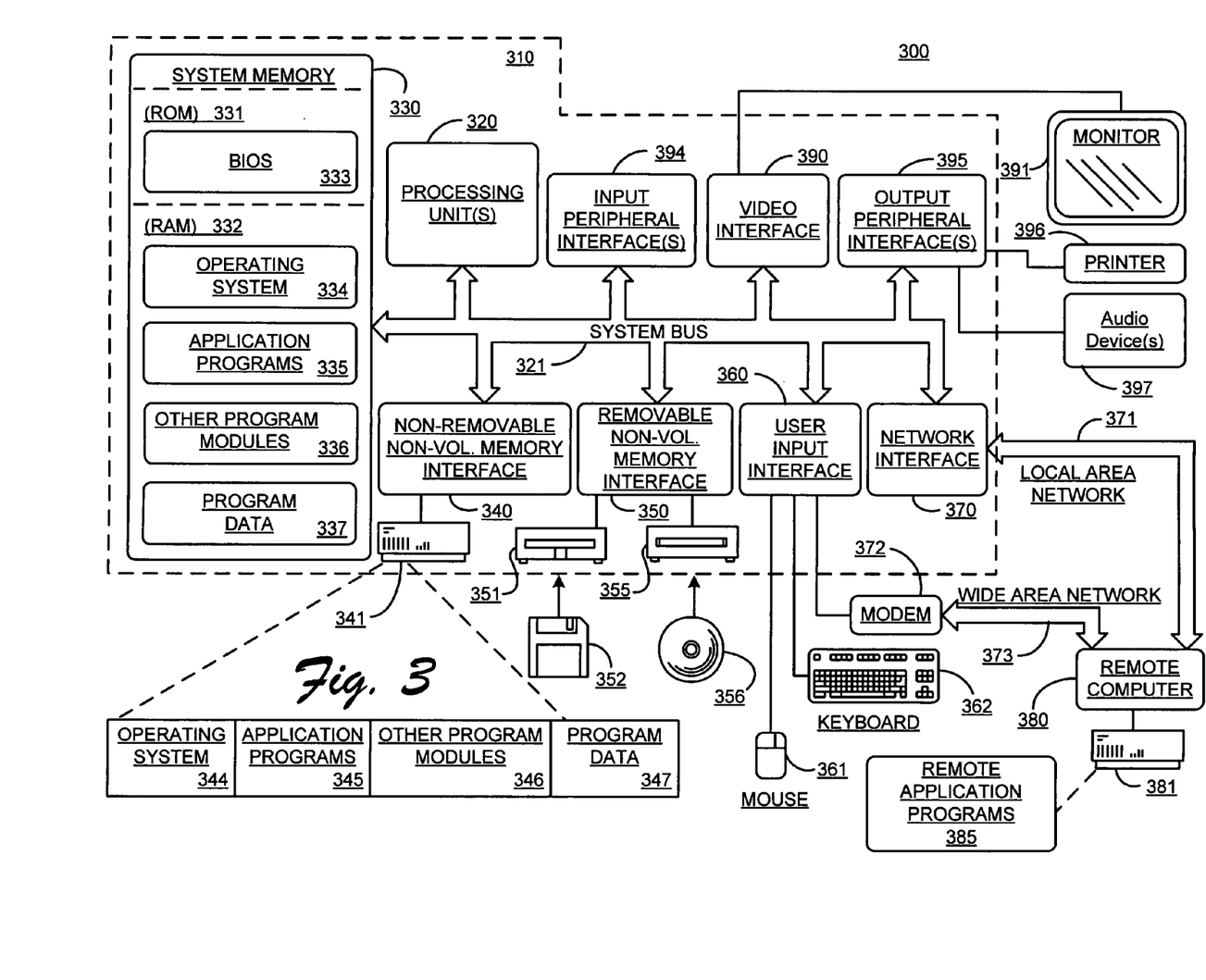
FIG. 3 shows an exemplary suitable computing environment on which the subsequently described systems, apparatuses and methods for parsing flexible audio codec topologies may be fully or partially implemented.

FIG. 3 illustrates an example of a suitable computing environment 300 on which the system 100 of FIG. 1 and the procedure 200 of FIGS. 1 and 2 for parsing flexible audio codec topologies may be fully or partially implemented. Accordingly, aspects of this computing environment 300 are described with reference to exemplary components and operations of FIGS. 1 and 2. The left-most digit of a component or operation (procedural block) reference number identifies the particular figure in which the component/operation first appears. Exemplary computing environment 300 is only one example of a suitable computing environment and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system for parsing flexible audio codec topologies includes a general purpose computing device in the form of a computer 310. Components of computer 310 may include, but are not limited to, processing unit(s) 320, a system memory 330, and a system bus 321 that couples various system components including the system memory to the processing unit 320. The system bus 321 is an exemplary implementation of internal bus 108 (FIG. 1) and may be any of several types of bus structures including a memory bus or memory controller, a peripheral bus, and a local bus using any of a variety of bus architectures. By way of example and not limitation, such architectures may include Industry Standard architecture (ISA) bus, Micro Channel architecture (MCA) bus, Enhanced ISA (EISA) bus, Video Electronics Standards association (VESA) local bus, and Peripheral Component Interconnect (PCI) bus also known as Mezzanine bus or PCI Express bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. In this implementation BIOS 333 stores default audio codec register values, which are shown in FIG. 1 as a respective portion of policy information 124. This policy information is used by audio class driver(s) 102 to determine valid audio codec topology configurations, thereby facilitating generation of topology port objects 116.

RAM 332 typically includes data and/or program modules that are immediately accessible to and/or presently being operated on by processing unit 320. By way of example and not limitation, FIG. 3 illustrates operating system 334, application programs 335, other program modules 336, and program data 338. In one implementation, operating system 334 comprises audio class driver(s) 102, and application programs 335 includes audio controller bus driver 104, audio controller 106, audio codec(s) 110, etc. Application programs 335 may also include one or more computer-program applications that operate under operating system 334 that will use wave and/or port topology objects 116 of FIG. 1 to interface with audio device(s) 397 coupled to respective ones of the audio codec(s) 110. Exemplary such audio devices include, speakers, microphones, headphones, and/or so on.

Program data 337 includes, for example, valid audio codec topologies 112, topology port object(s) 116, parameters for respective ones of command(s) 120, codec topology information 122, policy information 124 (e.g., user and OEM policy data), association data 126, priority sum(s) 128, high priority mapping(s) 130, intermediate calculations and/or data to generate topology port object(s) 116, etc.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 348. Note that these components can either be the same as or different from operating system 334, application programs 335, other program modules 336, and program data 338. Operating system 344, application programs 345, other program modules 346, and program data 348 are given different numbers here to illustrate that they are at least different copies.

A user may enter commands and information such as user audio policy data (a portion of policy information 124) into the computer 310 through input devices such as a keyboard 362 and pointing device 361, commonly referred to as a mouse, trackball or touch pad. Other input devices (not shown) may include a microphone (audio capture) audio device, joystick, game pad, satellite dish, scanner, or the like. These and other input devices are often connected to the processing unit 320 through a user input interface 360 that is coupled to the system bus 321, but may be connected by other interface and bus structures, such as a parallel port, game port, a universal serial bus (USB), IEEE 1394 AV/C bus, PCI bus, and/or the like.

A monitor 391 or other type of display device is also connected to the system bus 321 via an interface, such as a video interface 390. In addition to the monitor, computers may also include other peripheral output devices such as audio device(s) 397 and a printer 396, which may be connected through an output peripheral interface 395. In this implementation, respective ones of input peripheral interface(s) 394 and output peripheral interface(s) 395 encapsulate operations of audio codec(s) 110 of FIG. 1.

The computer 310 may operate in a networked environment using logical connections to one or more remote computers, such as a remote computer 380. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 383, but may also include other networks. Such networking environments are commonplace in offices, enterprise-wide computer networks, intranets and the Internet.

When used in a LAN networking environment, the computer 310 is connected to the LAN 381 through a network interface or adapter 380. When used in a WAN networking environment, the computer 310 typically includes a modem 382 or other means for establishing communications over the WAN 383, such as the Internet. The modem 382, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for parsing flexible audio codec topologies have been described in language specific to structural features and/or methodological operations or actions, it is understood that the implementations defined in the appended claims are not necessarily limited to the specific features or actions described. Accordingly, the specific features and actions are disclosed as exemplary forms of implementing the claimed subject matter.

The invention claimed is:

1. A method comprising:
   obtaining codec topology information from an audio codec, the codec topology information comprising a list of processing nodes, processing node connections, and configuration default data for respective processing nodes associated with the audio codec;
   evaluating, via a processing unit, the codec topology information to identify valid audio codec topologies based on set of valid connection path criteria, wherein the valid audio codec topologies are compatible with user audio policy settings and system vendor policy settings;
   calculating a prioritization number for each valid audio codec topology; and
   prioritizing each valid audio codec topology based on the prioritization number.

2. A method as recited in claim 1, wherein the audio codec information is high definition audio codec information.

3. A method as recited in claim 1, wherein each valid topology of the valid audio codec topologies is a substantially optimal path.

4. A method as recited in claim 1, wherein each topology of the valid audio codec topologies ends with a processing node with a physical connection.

5. A method as recited in claim 1, wherein each topology of the valid audio codec topologies does not share a render or capture processing node with another topology of the valid audio topologies.

6. A method as recited in claim 1, wherein topology of the valid audio codec topologies is independent from a looping topology.

7. A method as recited in claim 1, wherein evaluating valid audio codec topologies further comprises eliminating invalid codec topologies.

8. A method as recited in claim 1, wherein the prioritization number is a result of a function of an association default value of a processing node at the end of a connection path corresponding to the valid audio codec topology.

9. A method as recited in claim 1, wherein the prioritization number is calculated as follows:

$$\text{priority}=2^{N-k}; \text{ and}$$

wherein N represents a maximum association default value identified among the valid audio codec topologies, and k represents an association default value of the valid audio codec topology.

10. A method as recited in claim 1, and further comprising generating topology port objects for respective ones of the valid audio codec topologies, each topology port object being for use by an application to interface with one or more logical audio devices supported by the audio codec.

11. A method as recited in claim 10, wherein the topology port objects comprise wave or topology port objects.

12. A method as recited in claim 1, and further comprising:
   generating topology port objects for respective ones of the valid audio codec topologies, each topology port object being for use by an application to interface with one or more logical audio devices supported by the audio codec; and
   providing the topology port objects to an operating system for subsequent access by an application operating under the operating system.

13. A computer memory comprising computer-executable instructions executable by a processor for:
   requesting a set of characteristics from an audio codec, the characteristics comprising a list of processing node connections associated with respective ones of the audio codecs;
   receiving the characteristics; and
   responsive to receiving the characteristics, identifying valid audio codec topologies, each valid audio codec topology being associated with a particular logical audio device supported by the audio codec, the valid audio codec topologies being compatible with user audio policy settings and system vendor policy settings.

14. A computer memory as recited in claim 13, wherein each valid topology of the valid audio codec topologies represents a substantially optimal path.

15. A computer memory as recited in claim 13, wherein each topology of the valid audio codec topologies ends with a connection point that has a physical connection, and has respective input and output connection points that are not a shared codec resource with another topology of the valid audio topologies.

16. A computer memory as recited in claim 13, wherein each topology of the valid audio codec topologies is free from a looping topology.

17. A computer memory as recited in claim 13, wherein the computer-executable instructions further comprise instructions for:
    prioritizing each valid audio codec topology as a function of an association default value of a connection point at the end of a connection point connection path corresponding to the valid audio codec topology, the prioritizing indicating a single group of valid audio codec topologies; and
    providing an interface to an operating system for application access to respective topologies identified in the single group.

18. A computer memory as recited in claim 13, wherein the computer-executable instructions further comprise instructions for:
    prioritizing each valid audio codec topology as follows:

priority=$2^{N-k}$; and wherein N represents a maximum association default value identified among the valid audio codec topologies, and k represents an association default value of the valid audio codec topology.

19. A computer memory as recited in claim 13, wherein the computer-executable instructions further comprise instructions, after identifying, for generating topology port objects for respective ones of the valid audio codec topologies, each topology port object being for use by an application to interface with one or more logical audio devices supported by the audio codec.

20. A computer memory as recited in claim 19, wherein the topology port objects comprise wave or topology port objects.

21. A computer memory as recited in claim 13, wherein the computer-executable instructions further comprise instructions, after identifying, for:
    generating topology port objects for respective ones of the valid audio codec topologies, each topology port object being for use by an application to interface with one or more logical audio devices supported by the audio codec; and
    providing the topology port objects to an operating system for subsequent access by an application operating under the operating system.

22. A computing device providing a uniform audio class driver architecture, the computing device comprising:
    a processor; and
    a memory coupled to the processor, the memory comprising computer-program instructions executable by the processor for:
        communicating, by one or more generic audio drivers, a request to an audio codec via an audio controller bus driver to obtain a connection list of substantially all connections defined by the audio codec; and
        identifying substantially all valid audio codec topologies from the connection list, the valid audio codec topologies being compatible with user policies and original equipment manufacturer policies.

23. A computing device as recited in claim 22, wherein each topology of the valid audio codec topologies ends with a connection point that has a physical connection.

24. A computing device as recited in claim 22, wherein each topology of the valid audio codec topologies has a respective input or output connection point that is not a shared codec resource with another topology of the valid audio topologies.

25. A computing device as recited in claim 22, wherein no topology of the valid audio codec topologies is a looping topology.

26. A computing device as recited in claim 22, and further comprising computer-program instructions for prioritizing each valid audio codec topology as a function of an association default value of a connection point at the end of a connection point connection path corresponding to the valid audio codec topology.

27. A computing device as recited in claim 22, and further comprising computer-program instructions for generating topology port objects for respective ones of the valid audio codec topologies, each topology port object being for use by an application to interface with one or more logical audio devices supported by the audio codec.

28. A computing device as recited in claim 27, wherein the topology port objects comprise wave or topology port objects.

29. A computing device as recited in claim 22, and further comprising computer-program instructions for:
    generating, by respective ones of the one or more generic audio class drivers, topology port objects for associated ones of the valid audio codec topologies, each topology port object being for use by an application to interface with one or more logical audio devices supported by the audio codec; and
    providing, by the respective ones, the topology port objects to an operating system for subsequent access by an application operating under the operating system.

30. A computing device for parsing flexible audio codec topologies, the computing device comprising:
    obtaining means to obtain codec topology information from an audio codec, the codec topology information comprising a list of processing node connections associated with respective ones of the audio codecs, one or more of the processing node connections representing invalid connections;
    filtering means to automatically eliminate the invalid connections to identify valid audio codec topologies, each valid audio codec topology being associated with a particular logical audio device supported by the audio codec, the valid audio codec topologies being compatible with user audio policy settings or system vendor policy settings; and
    prioritizing means to prioritize each valid audio codec topology having a priority value calculated as a function of an association default value of a connection point at the end of a connection point connection path corresponding to the valid audio codec topology.

31. A computing device as recited in claim 30, wherein each topology of the valid audio codec topologies is an end-to-end connected topology, and has respective input and output capabilities that are not a shared codec resource with another topology of the valid audio topologies.

32. A computing device as recited in claim 30, wherein no topology of the valid audio codec topologies is a looping topology.

33. A computing device as recited in claim 30, wherein the prioritizing means includes prioritizing each valid audio codec topology by defining a priority as:

$$priority = 2^{N-k},$$

where N represents a maximum association default value identified among the valid audio codec topologies, and k represents an association default value of the valid audio codec topology.

34. A computing device as recited in claim 30, and further comprising generating means to instantiate wave or topology port objects for respective ones of the valid audio codec topologies, each topology port object being for use by an application to interface with one or more logical audio devices supported by the audio codec.

35. A computing device as recited in claim 30, and further comprising:
generating means to generate topology port objects for respective ones of the valid audio codec topologies, each topology port object being for use by an application to interface with one or more logical audio devices supported by the audio codec; and providing means to provide the topology port objects to an operating system for subsequent access by an application operating under the operating system.

* * * * *